United States Patent [19]

Jones, III

[11] Patent Number: 5,629,058
[45] Date of Patent: May 13, 1997

[54] PREPRINTED SHAPE-SPECIFIC LABELLING FOR DIAMOND PAPERS

[75] Inventor: William M. Jones, III, Pine Bluff, Ark.

[73] Assignee: Sissy's Log Cabin Inc., Pine Bluff, Ark.

[21] Appl. No.: 436,826

[22] Filed: May 8, 1995

[51] Int. Cl.$^6$ .............................. B32B 1/08; B29D 22/00
[52] U.S. Cl. .................. 428/34.2; 428/34.1; 428/535; 428/537.5; 206/459.1; 206/459.5; 206/484; 206/524.1; 206/524.2; 206/524.6
[58] Field of Search .................. 428/34.2, 34.1, 428/535, 537.5, 195; 229/71; 206/459.1, 459.5, 484, 524.1, 524.2, 524.6; 283/81; 156/DIG. 1, DIG. 5, 204; 364/479

[56] References Cited

U.S. PATENT DOCUMENTS

4,655,026  4/1987  Wigoda ........................................ 53/55
5,405,561  4/1995  Dais et al. .............................. 264/40.1

*Primary Examiner*—Patrick Ryan
*Assistant Examiner*—Elizabeth Evans
*Attorney, Agent, or Firm*—Cushman Darby & Cushman, IP Group of Pillsbury Madison & Sutro, LLP

[57] ABSTRACT

A method is provided for making diamond packages according to a standardized format so as to indicate on a stylized icon set of the shape, indications of imperfections, and verbal indications of weight, clarity, color, measurements, price, and comments. The method makes use of a preprinted set of information-receptive fields, particularly arranged to accommodate conventional folding of diamond papers. The preprinted sets can be preprinted on stick-on labels, or directly on the outer faces of the outer sheets of the diamond packages.

9 Claims, 7 Drawing Sheets

PREPRINTED SHAPE-SPECIFIC LABELLING FOR DIAMOND PAPERS

BACKGROUND OF THE INVENTION

It has been customary to wrap individual loose (non-set) gem-quality diamonds in so-called diamond papers, which typically are three layers of sheet material folded about two mutually perpendicular sets of axes to enclose the respective individual diamonds.

Conventionally, the outside layer is a sheet of bond paper, the middle layer is a sheet of glassine, and the inner layer is a sheet of light blue glassine. The typical length and width of the papers is 15 cm×17 cm, and conventionally, the three layers are superimposed so that their respective edges coincide, and folded sides to middle and convolutely top to bottom, with a single reverse of half an inner panel to provide a package measuring about 4.5 cm×8 cm.

Often each diamond, while so packaged, changes hands several times, and each holder may have occasion to open one or more packages that he or she has acquired from various sources, for showing and comparing or selecting various one of the diamonds.

While the diamonds are so packaged, it is difficult for most people to remember which diamond is in which package, and what its shape, quality and price are.

Naturally, some persons in the trade have taken to writing more or less cryptic notations on their packages, for the purpose of providing an indication of what is inside without needing to open the package.

However, if a diamond changes hands while so packaged, it too frequently proves difficult for the new possessor to decipher the notations made on the package by the former possessor or someone earlier in the chain of possession. If the new possessor, in such a circumstance is indolent, perhaps they live with the confusion and occasionally mistake one of their packaged diamonds for another and give a bargain they hadn't meant, or deliver the wrong goods, creating suspicion as to their trustworthiness. But, if they are industrious, they rewrap the diamond in a new package, and mark on it identifying factors that are most meaningful to them. Clearly, if this effort can be avoided, all in the chain of distribution, as a whole, and most individually, will stand to gain.

Further, to the present inventor's knowledge, although some diamond distribution chain members' individual notations doubtless include on their respective packages information about the shape, weight, measurements, clarity, color, price, notable defects and/or other characteristics of a particular diamond, the information certainly is not universally provided, nor provided in a standard format. As a result, when two or more packages are opened concurrently and the diamonds removed, it is all too easy to get the wrong ones back into the respective packages, and difficult to double-check whether such an unintended transposition has occurred.

SUMMARY OF THE INVENTION

A method is provided for making diamond packages according to a standardized format so as to indicate on a stylized icon set of the shape, indications of imperfections, and verbal indications of weight, clarity, color, measurements, price, and comments. The method makes use of a preprinted set of information-receptive fields, particularly arranged to accommodate conventional folding of diamond papers. The preprinted sets can be preprinted on stick-on labels, or directly on the outer faces of the outer sheets of the diamond packages.

The principles of the invention will be further discussed with reference to the drawings wherein preferred embodiments are shown. The specifics illustrated in the drawings are intended to exemplify, rather than limit, aspects of the invention as defined in the claims.

DETAILED DESCRIPTION

A typical diamond paper package or set of diamond papers for packaging an individual cut and polished gem-quality diamond is shown in the drawings at 10, except that in the instance depicted, the paper set is provided on its outside with a preprinted set 12 of identifying information-receiver fields.

The paper set, by preference, is a non-adhered, merely superimposed-in-registry set of rectangular sheets of paper, the outermost one of which is a white bond paper sheet 14, the middle one of which is a white glassine sheet 16 and the inner one of which is a blue glassine sheet 18.

Figure 3:
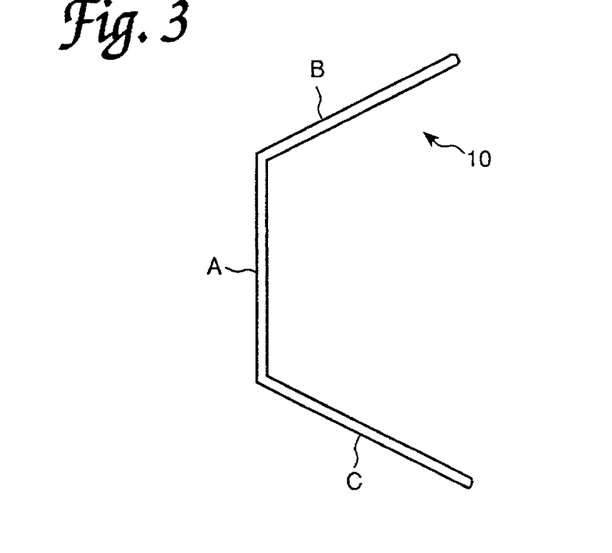
FIG. 3 is an end view thereof in a partly unwrapped condition, showing a traditional folding patters.
Figure 4:
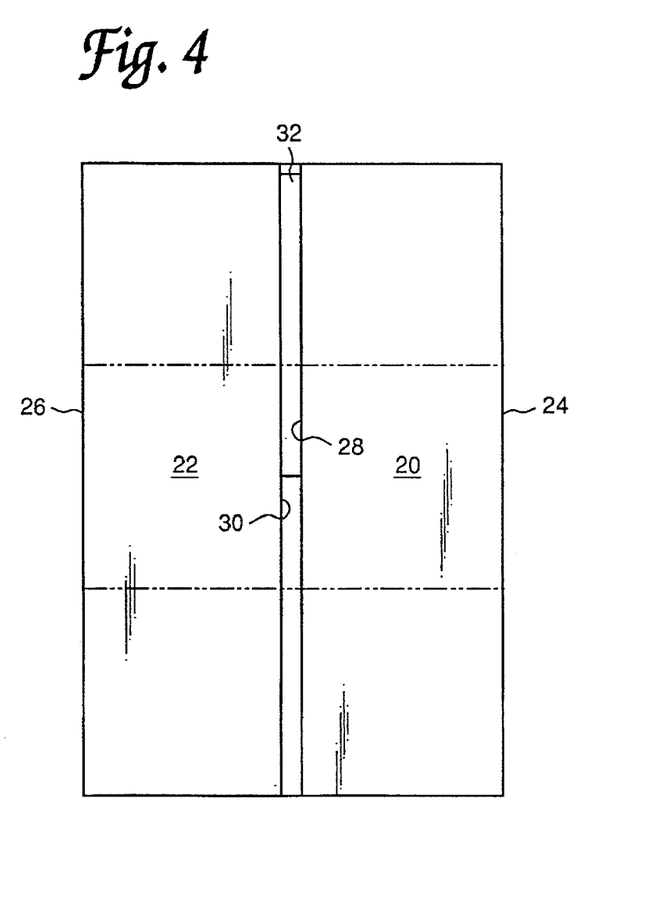
FIG. 4 is a facial view of the inside of the package in its partly unwrapped condition, showing its non-labeled face.
Figure 5:
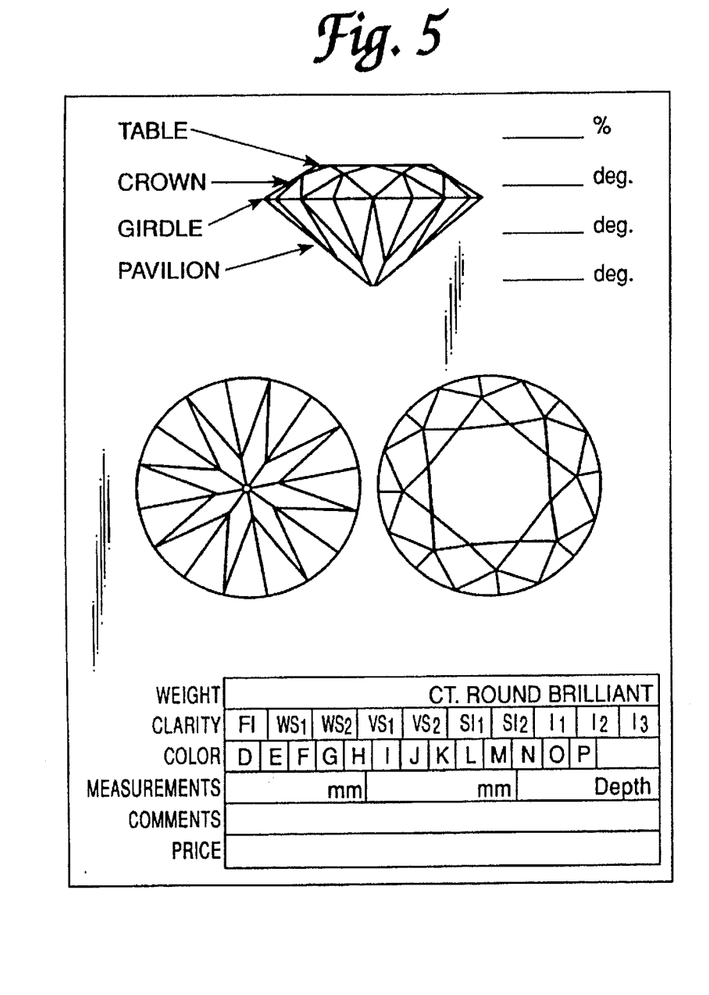
FIGS. 5–12 are front elevation views of stick-on labels for eight popular cuts of diamonds.
Figure 6:
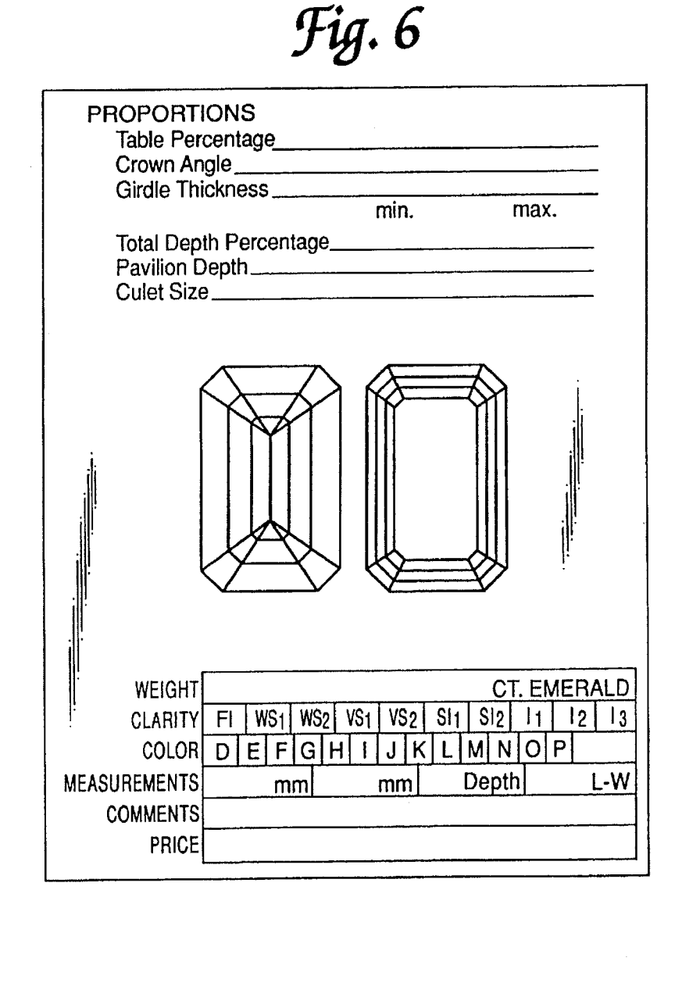
Figure 7:
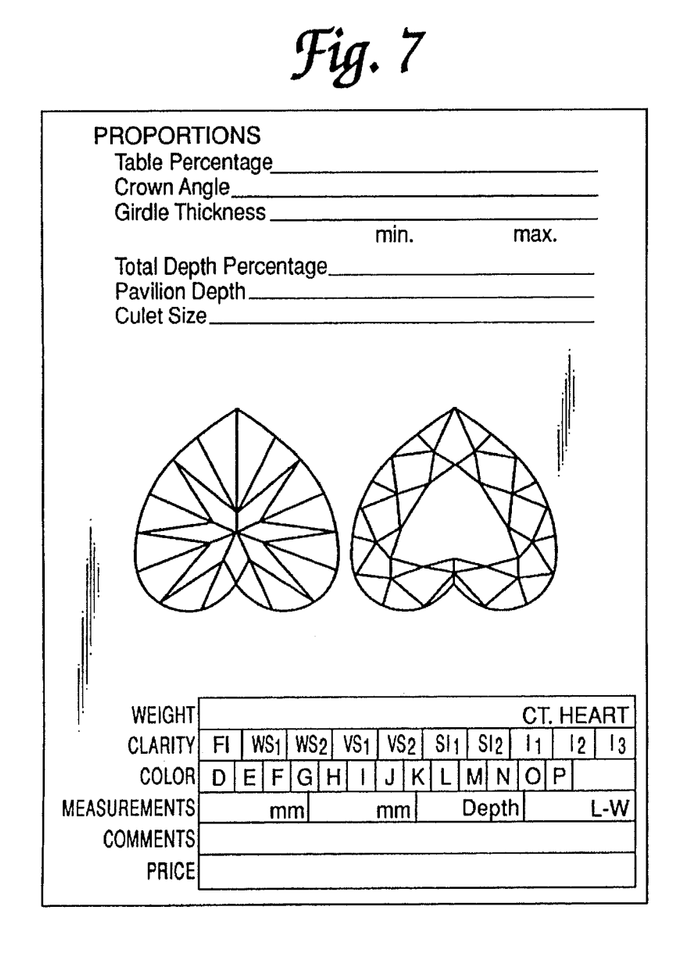
Figure 8:
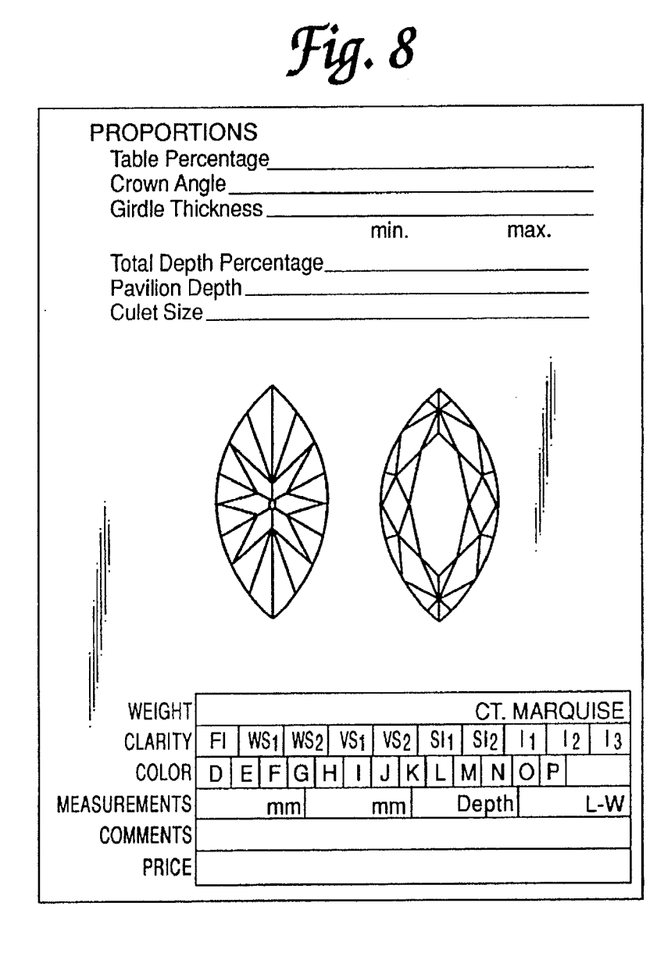
Figure 9:
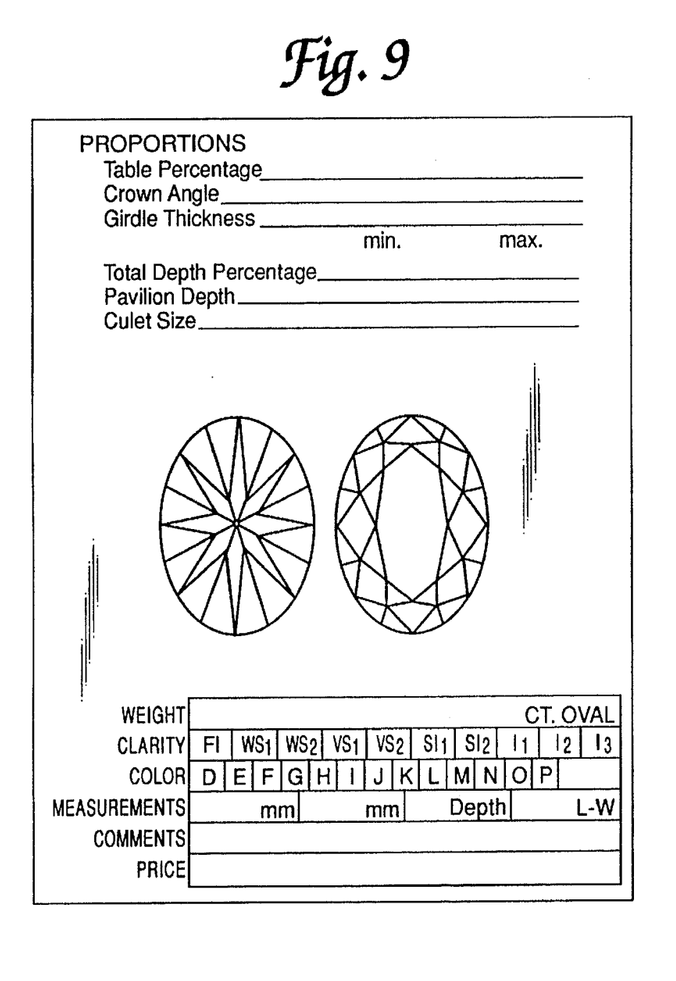
Figure 10:
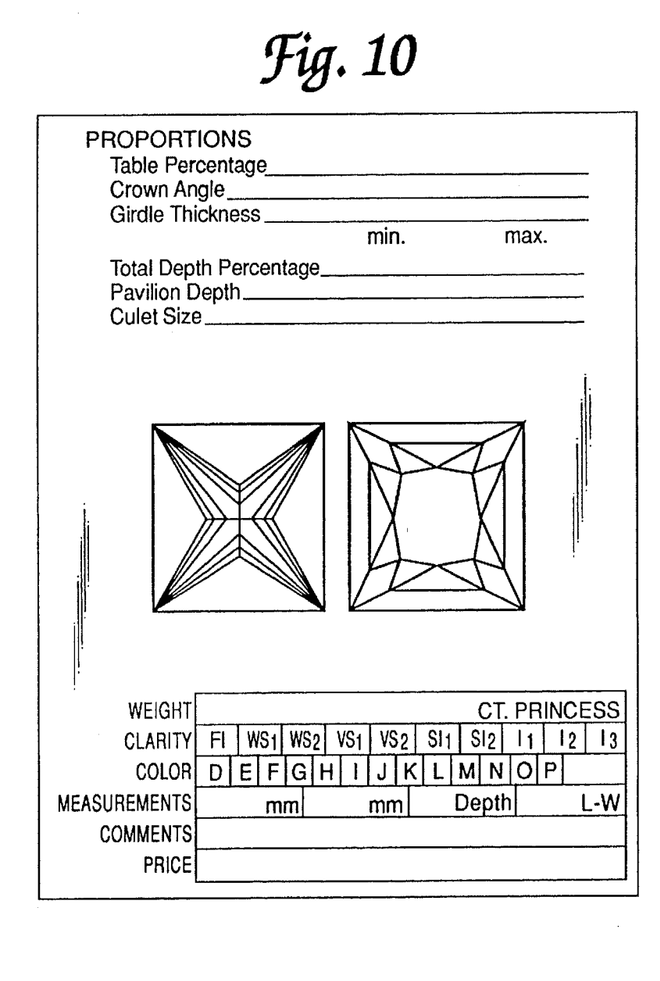
Figure 11:
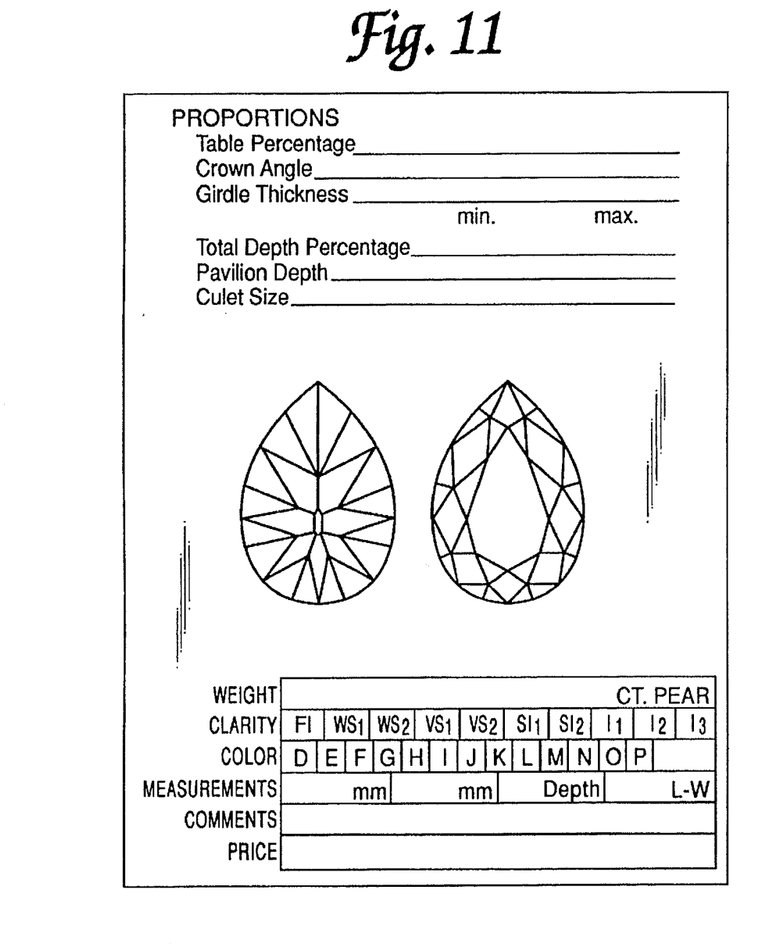
Figure 12:
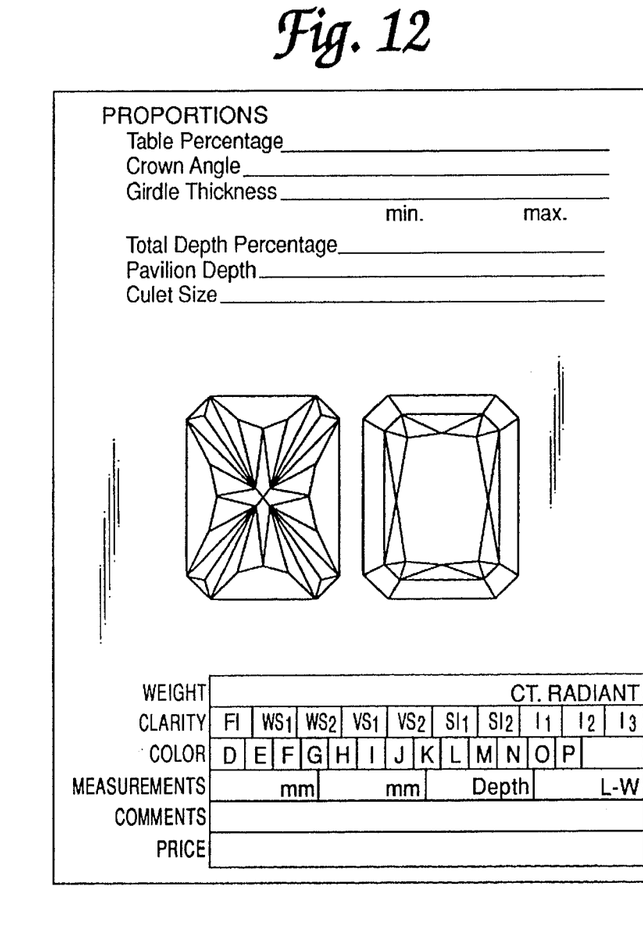
Figure 13:
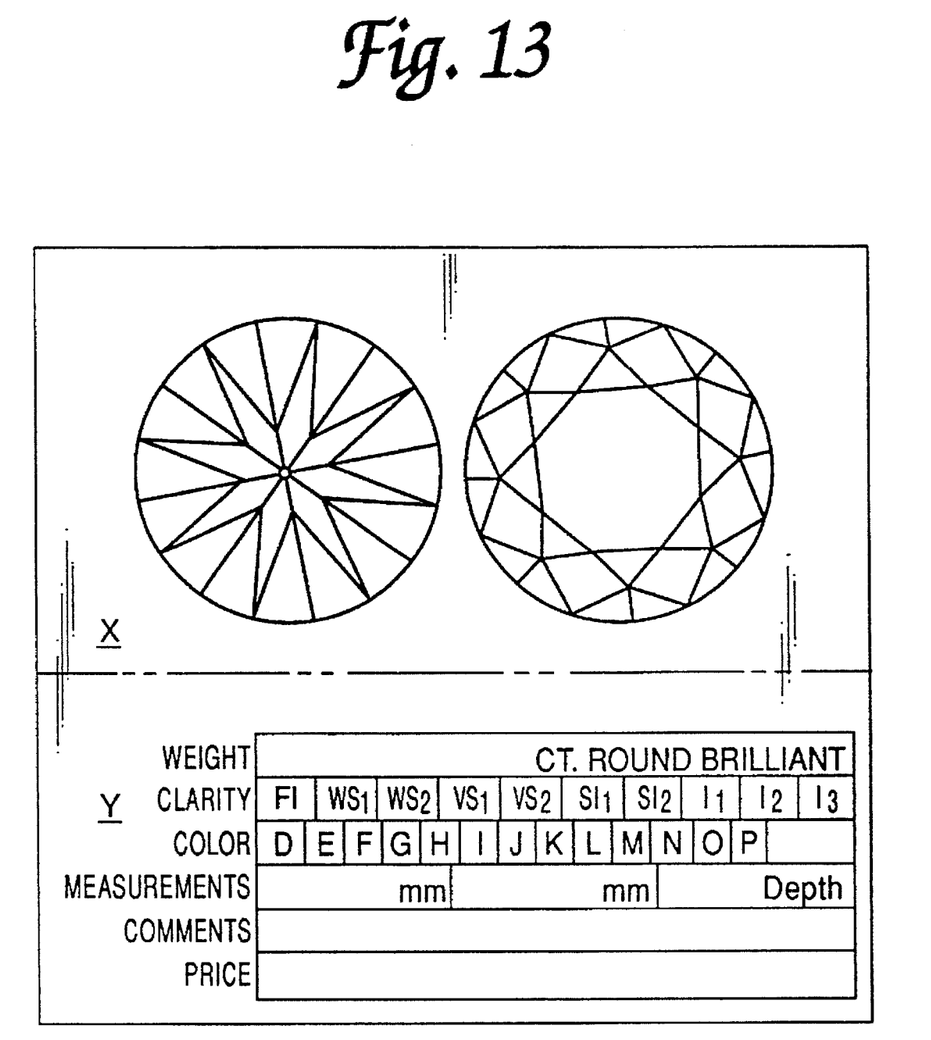
FIG. 13 shows an abbreviated format information-receiver field set (two views instead of three), a variation which can be used for any of the cuts.

The package is folded to enclose an individual diamond 120, by folding left and right lateral panels 20, 22 on fold lines 24, 26, so that the side edges 28, 30 lie adjacent one another medially of the package and generally medially of the central panel 32. The package is also folded along fold lines 34, 36, 38, 40, so as to provide four full-height panels 42, 44, 46, 48 and one approximately half-height panel 50. The fold lines 24, 26 are orthogonal to the fold lines 34–40. In fact, the order of folding is 38, 24, 26, 36 and 40, then 34, so that the outer faces of the package are formed by the first and second indicated panels A, B of the central panel of the outer, bond paper sheet, with a third indicated panel C being next-most accessible upon partially opening the package.

Figure 1:
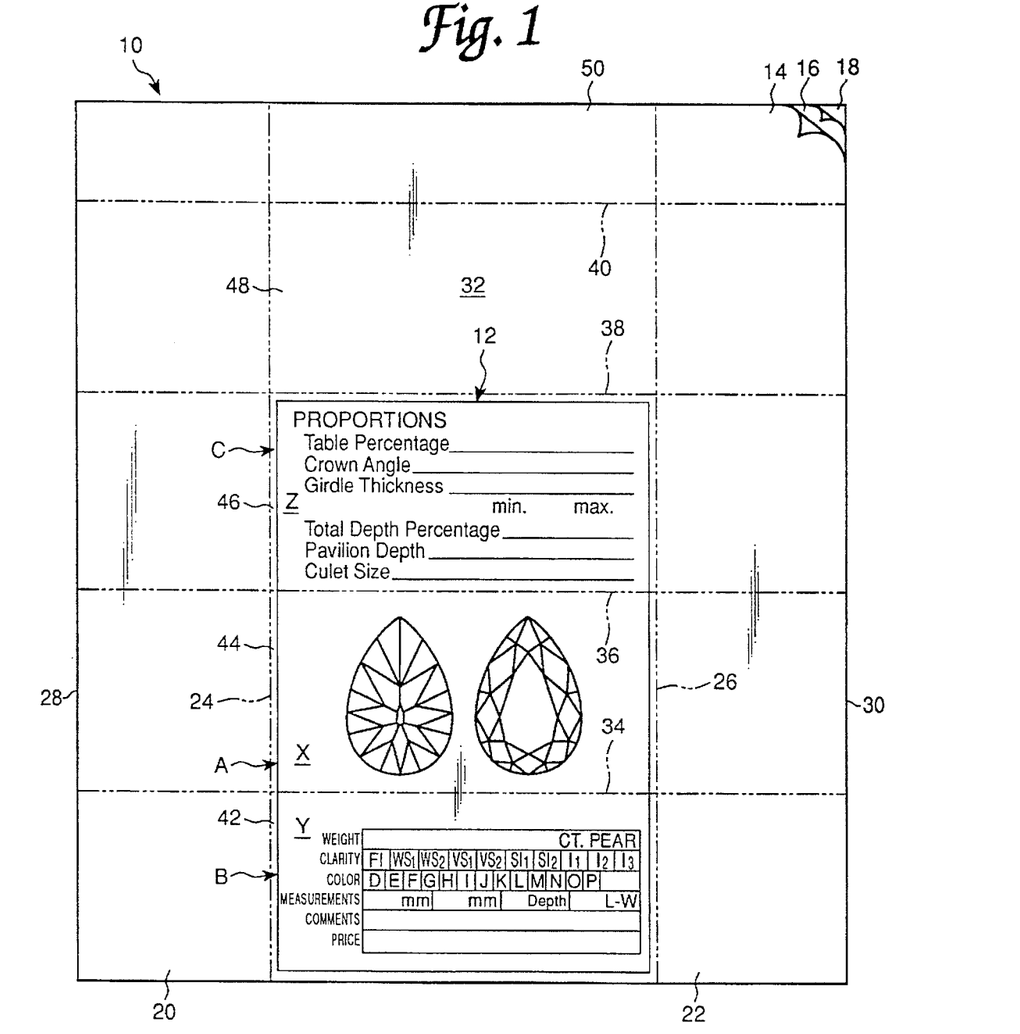
FIG. 1 is a perspective outer side view of a diamond package with preprinted identifying information-receiver field sets provided in accordance with principles of the present invention.
Figure 2:
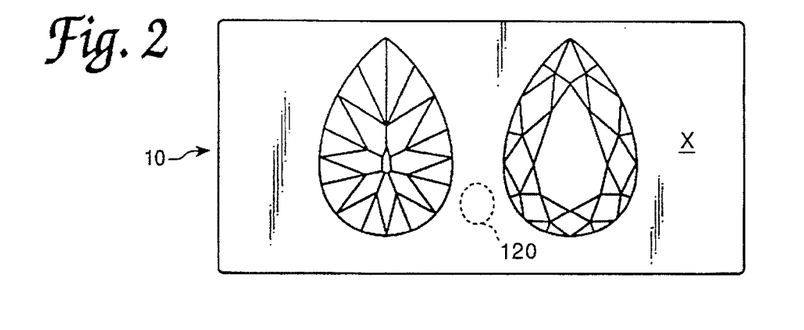
FIG. 2 is a facial view thereof in a closed condition, showing one face of the package.

The preprinted set of identifying information-receiver fields 12 can either be printed directly on the outer face of the outer sheet of the set of diamond papers, or preprinted on adhesive labels which are then stuck onto that sheet face, so as to have two respective portions X, Y thereof respectively coincide with panels A, B, or so as to have three respective portions X, Y, Z thereof respectively coincide with panels A, B, C.

The three-panel version of the set is likely more appropriate for use by diamond retailers, and the two-panel version by diamond wholesalers.

If the sets are preprinted on stick-on labels, the labels fold at the same one place or two places where the outer sheet of the respective paper folds.

On both the two-panel and three-panel sets of preprinted information-receiver fields 12, a first panel, e.g., panel A contains one or more stylized, iconic (generalized) graphical representations (e.g., front and rear) of a respective one (e.g., of eight) popular diamond cuts (e.g., round brilliant, marquise, heart, princess, oval, radiant, emerald and pear).

Also on both, a second panel, e.g., panel B contains, in tabular format, verbally marked spaces for multiple-choice selection, or fill-in-the-blank entry of information as to weight, clarity, color, measurements, comments and price. The name of the shape preferably also is verbally provided in the preprinting on this panel.

In case of there being a third panel, C, the third panel preferably contains a third, e.g., side view in iconic form, together with spaces for entry of information as to the table percentage, crown angle, girdle thickness or angle, pavilion angle, cullet size, and/or total depth percentage (as is appropriate to the particular cut).

Other forms of papers (i.e., other than three superimposed sheets having the above-described constituency) are also in use or could be used, despite their being currently less preferred by the present inventor. These can be directly preprinted, or labeled in an analogous manner to the way shown and described herein.

In practicing the method, an individual diamond is examined, a respective preprinted package or label for the shape is selected, and its iconic representations marked to show the shapes, locations and sizes of imperfections. Other respective information is filled in to the respective blanks or selected from the respective multiple choice field sets, and the set of papers is folded as described above so as to safely enclose the diamond, and bring the information-bearing panels A and B, or A, B and C to the visually accessible locations shown and described.

It should now be apparent that the preprinted shape-specific labelling for diamond papers as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A structure for providing a diamond package having a standardized format so as to indicate iconically and verbally information specific to particular enclosed cut, gem-quality diamond having one of a number of given styles of cut, using a multiple panel, foldable sheet package foldable about two sets of mutually orthogonal axes so as to create an inner compartment and leave two rectangular panels outermost on opposite sides, said structure providing:

means providing an outer face of said foldable sheet package with a preprinted set of identifying information-receiver fields arranged in at least two panels which correspond in location to said two rectangular panels, one of which contains at least one iconic representation of a respective style of cut, and another of which contains in tabular form verbal indications of information-receiver fields for weight, clarity, color, measurements, comments and price, for use by:

examining a cut diamond so as to determine its imperfections, weight, clarity, color and measurements, and decide on its price and comments to make in regard thereto;

entering markings spatially analogous to the imperfections on at least one said ionic representation;

entering or selecting verbal indicia corresponding to said weight, clarity, color, measurements, price and comments in respective said fields of said set; and folding said foldable sheet package along said axes so as to enclose said cut diamond.

2. The structure of claim 1, wherein:

said preprinted set of identifying information-receiver fields is printed directly on a surface of a sheet of said foldable sheet package.

3. The structure of claim 1, wherein:

said preprinted set of identifying information-receiver fields is printed on an adhesive label, and said label is adhered onto a surface of a sheet of said foldable sheet package.

4. The structure of claim 1, wherein:

said preprinted set of identifying information-receiver fields is provided so as to further include a third panel which corresponds in location to a rectangular panel of said foldable sheet package which is contiguous to one of said two rectangular panels, and contains an iconic representation of a style of cut from a side, and includes in tabular form indications of information-receiver fields for percentage and/or angle of respective features of a respective style of cut as notable from a side of the diamond, so that a user may further:

determine information as to said respective features; and enter said information as to said respective features in respective of said information-receiver fields on said third panel.

5. The structure of claim 1, wherein said multiple panel, foldable sheet package comprises:

an outer sheet made of bond paper and having said outer face;

a middle sheet made of white glassine; and an inner sheet made of blue glassine;

said sheets being rectangular, of equal size, and loosely superimposed with respective edges generally in registration with one another.

6. A method for marking diamond packages according to a standardized format so as to indicate iconically and verbally information specific to particular enclosed cut, gem-quality diamonds each having one of a number of given styles of cut, comprising:

providing a multiple panels, foldable sheet package foldable about two sets of mutually orthogonal axes so as to create an inner compartment and leave two rectangular panels outermost on opposite sides;

providing an outer face of said foldable sheet package with a preprinted set of identifying information-receiver fields arranged in at least two panels which correspond in location to said two rectangular panels, one of which contains at least one iconic representation of a respective style of cut, and another of which contains in tabular form verbal indications of information-receiver fields for weight, clarity, color, measurements, comments and price;

examining a cut diamond so as to determine its imperfections, weight, clarity, color and measurements, and decide on its price and comments to make in regard thereto;

entering markings spatially analogous to the imperfections on at least one said iconic representation;

entering or selecting verbal indicia corresponding to said weight, clarity, color, measurements, price and comments in respective said fields of said set; and folding said foldable sheet package along said axes so as to enclose said cut diamond.

7. The method of claim 6, wherein:

said preprinted set of identifying information-receiver fields is provided by printing it directly on a surface of a sheet of said foldable sheet package.

8. The method of claim 6, wherein:

said preprinted set of identifying information-receiver fields is preprinted by printing it on an adhesive label, and adhering said label onto a surface of a sheet of said foldable sheet package.

9. The method of claim 6, wherein:

said preprinted set of identifying information-receiver fields is provided so as to further include a third panel which corresponds in location to a rectangular panel of said foldable sheet package which is contiguous to one of said two rectangular panels, and contains an iconic representation of a style of cut from a side, and includes in tabular form indications of information-receiver fields for percentage and/or angle of respective features of a respective style of cut as notable from a side of the diamond;

said examining step further includes determining information as to said respective features; and said entering step includes entering said information as to said respective features in respective of said information-receiver fields on said third panel.

* * * * *